(12) United States Patent
Tanaka et al.

(10) Patent No.: US 9,548,484 B2
(45) Date of Patent: Jan. 17, 2017

(54) STRUCTURE OF BATTERY UNIT SUITABLE FOR INSTALLATION OF WATER DAMAGE SENSOR

(71) Applicant: DENSO CORPORATION, Kariya, Aichi-pref. (JP)

(72) Inventors: Tsuyoshi Tanaka, Chiryu (JP); Yoshinori Yamaguchi, Kariya (JP); Hidehiro Kinoshita, Nagoya (JP); Hiroaki Higuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 130 days.

(21) Appl. No.: 14/190,916

(22) Filed: Feb. 26, 2014

(65) Prior Publication Data

US 2014/0242427 A1 Aug. 28, 2014

(30) Foreign Application Priority Data

Feb. 27, 2013 (JP) .................................. 2013-036765

(51) Int. Cl.
*H01M 2/22* (2006.01)
*H01M 2/10* (2006.01)
(Continued)

(52) U.S. Cl.
CPC ............. *H01M 2/22* (2013.01); *H01M 2/1072* (2013.01); *H01M 10/0525* (2013.01);
(Continued)

(58) Field of Classification Search
None
See application file for complete search history.

(56) References Cited

U.S. PATENT DOCUMENTS

2009/0111294 A1* 4/2009 Barry et al. .................... 439/78
2011/0097619 A1* 4/2011 Park ............................. 429/159
(Continued)

FOREIGN PATENT DOCUMENTS

CN 2702453 * 5/2005 ............ H01M 10/48
JP 2003-059467 A 2/2003
(Continued)

OTHER PUBLICATIONS

Jun. 23, 2015 Office Action issued in Japanese Patent Application No. 2013-036765.

*Primary Examiner* — Miriam Stagg
*Assistant Examiner* — Carmen Lyles-Irving
(74) *Attorney, Agent, or Firm* — Oliff PLC

(57) ABSTRACT

A battery unit is provided which includes a control board, a storage case, a water detector, and an electrical conductor. The storage case is made of an assembly of a first and a second casing member. The first casing member has an upright wall which extends from the bottom thereof and surrounds the battery. The second casing member also has an extension which extends toward the bottom of the first casing member. The water detector is located close to the lower end of the extension of the second casing member. The electric conductor extends upward from the upper end of the extension and are electrically joined to the water detector. The electric conductor is also mechanically and electrically joined to the control board. This structure facilitates the ease with which the water detector is installed electrically and mechanically in the battery unit.

6 Claims, 13 Drawing Sheets

(51) Int. Cl.
*H01M 10/0525* (2010.01)
*H01M 10/48* (2006.01)
*H01M 10/42* (2006.01)

(52) U.S. Cl.
CPC ......... *H01M 10/425* (2013.01); *H01M 10/48* (2013.01); *H01M 10/42* (2013.01); *H01M 2220/20* (2013.01)

(56) References Cited

U.S. PATENT DOCUMENTS

2011/0244283 A1  10/2011  Seto et al.
2014/0011058 A1   1/2014  Adachi et al.

FOREIGN PATENT DOCUMENTS

JP    A-2011-216401    10/2011
JP    A-2014-13723      1/2014

* cited by examiner

STRUCTURE OF BATTERY UNIT SUITABLE FOR INSTALLATION OF WATER DAMAGE SENSOR

CROSS REFERENCE TO RELATED DOCUMENT

The present application claims the benefit of priority of Japanese Patent Application No. 2013-36765 filed on Feb. 27, 2013, the disclosure of which is incorporated herein by reference.

BACKGROUND OF THE INVENTION

1 Technical Field of the Invention

The present invention relates generally to a battery unit which includes a storage battery disposed in a storage casing mounted in vehicles such as automobiles.

2 Background Art

Battery units are known which include a storage battery (also called an assembled battery module) equipped with a plurality of electrochemical cells and assembled along with a control board in the form of a battery unit. For instance, Japanese Patent First Publication No. 2011-216401 teaches such a type of battery unit. The battery units are also proposed to be mounted in automobiles with a water damage sensor (which is also called a submergence detection sensor). The water damage sensor is installed in the battery unit and works to detect whether the battery unit has been submerged in water or not, for example, in the case where the automobile is put in water. A controller such as a CPU fabricated on the control board analyzes an output from the water damage sensor to deactivate a charging/discharging operation of the assembled battery module.

The water damage sensor is connected electrically to the control board through flexible wire. Such connection is, however, complicated.

SUMMARY OF THE INVENTION

It is therefore an object of this disclosure to provide an improved structure of a battery unit which facilitates installation of a water damage sensor in the battery unit.

According to one aspect of the embodiment, there is provided a battery unit which may be employed with automotive vehicles. The battery unit comprises: (a) a battery; (b) a control board on which an electronic device is mounted to control an operation of the battery; (c) a storage case in which the battery and the control board are installed, the storage case including a first casing member and a second casing member joined to the first casing member, the first casing member having a bottom on which the battery is mounted and an upright wall which extends from the bottom and surrounds the battery, the second casing member having the battery interposed between itself and the first casing member, the second casing member also having an extension which extends toward the bottom of the first casing member and has a lower end facing the bottom inside the upright wall of the first casing member and an upper end opposed to the lower end; (d) a water detector; and (e) an electrical conductor. The water detector is located close to the lower end of the extension of the second casing member. The water detector works to detect presence of water having entered the storage case. The electrical conductor extends upward from the upper end of the extension and are electrically joined to the water detector. The electric conductor is also mechanically joined to the control board to establish an electrical connection with the control board which is mounted in place within the storage case.

The water detector is, as described above, located near the lower end of the extension of the second casing member, so that the water detector is located closer to the bottom of the first casing member, thus enabling the water detector to sense the presence of water at a desired level within the storage case.

The electrical conductor which is connected electrically to the water detector extends upward from the extension. The installation of the control board in place within the storage case achieves the electrical and mechanical joint with the electrical conductor. This eliminates the need for an electrical conductor such as wire to establish the electrical connection between the water detector and the control board and also facilitates the ease with which the water detector is disposed within the battery unit.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiments but are for the purpose of explanation and understanding only.

In the drawings:

FIG. 8(*b*) is a bottom view of the intermediate case of FIG. 7;

DESCRIPTION OF THE PREFERRED EMBODIMENTS

Figure 1:
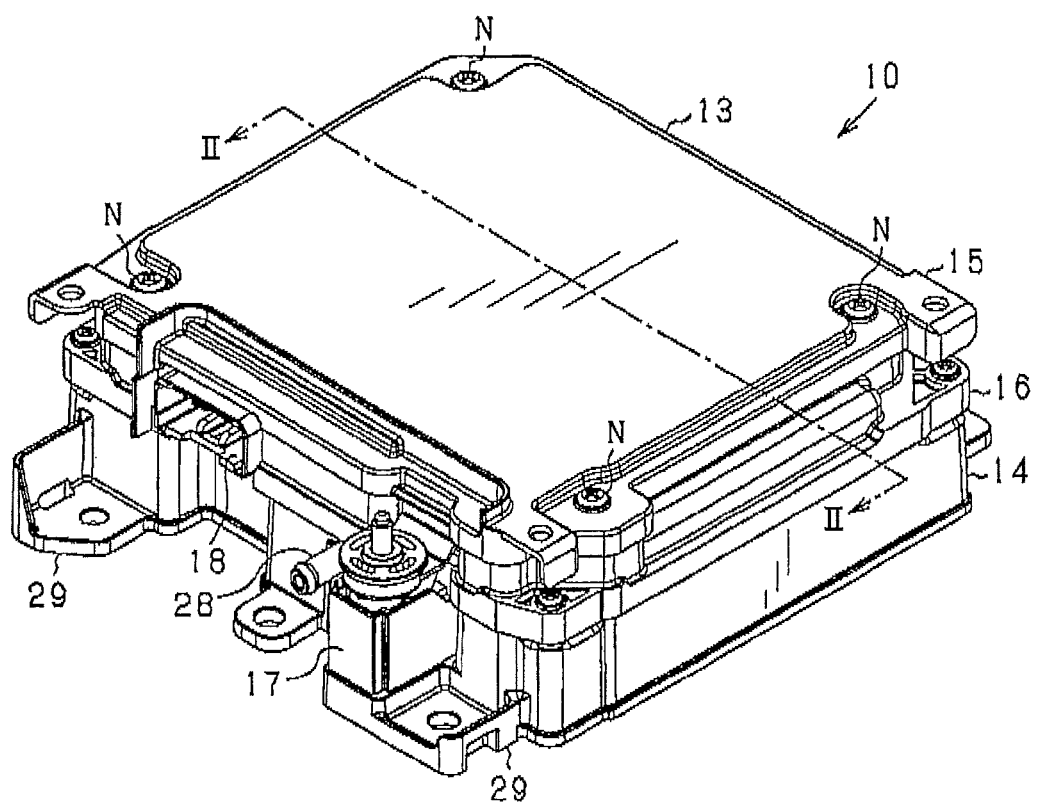
FIG. 1 is a perspective view which shows an overall structure of a battery unit according to an embodiment.
Figure 2:
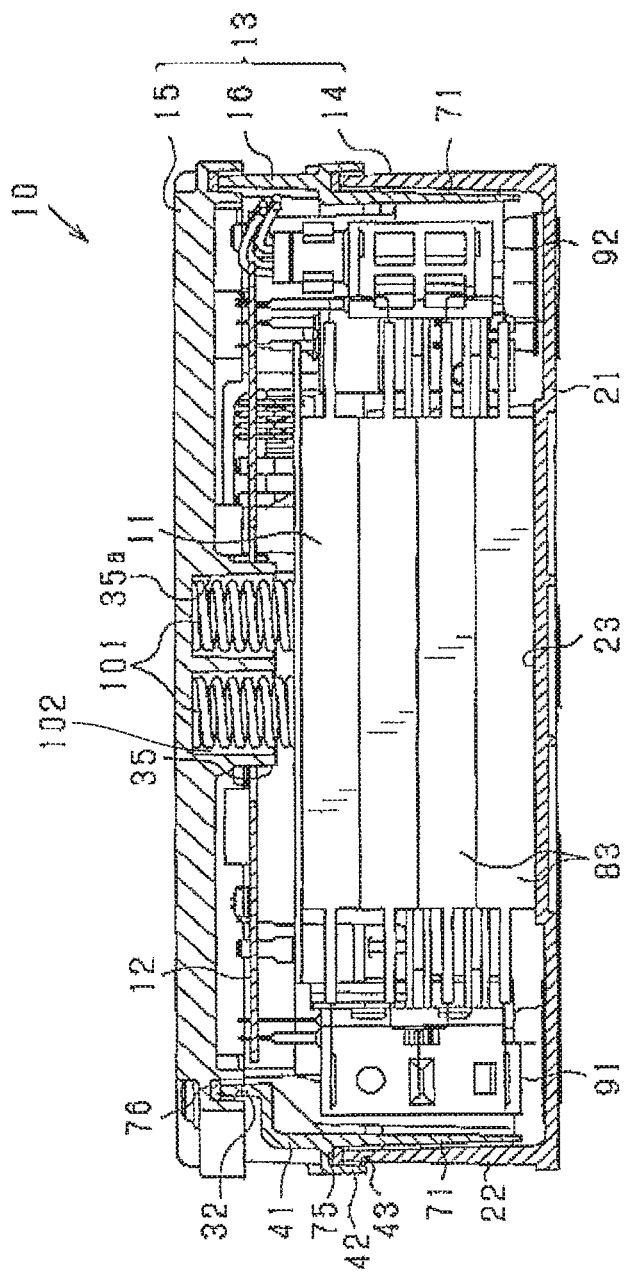
FIG. 2 is a transverse sectional view, as taken long the line II-II in FIG. 1.
Figure 3:
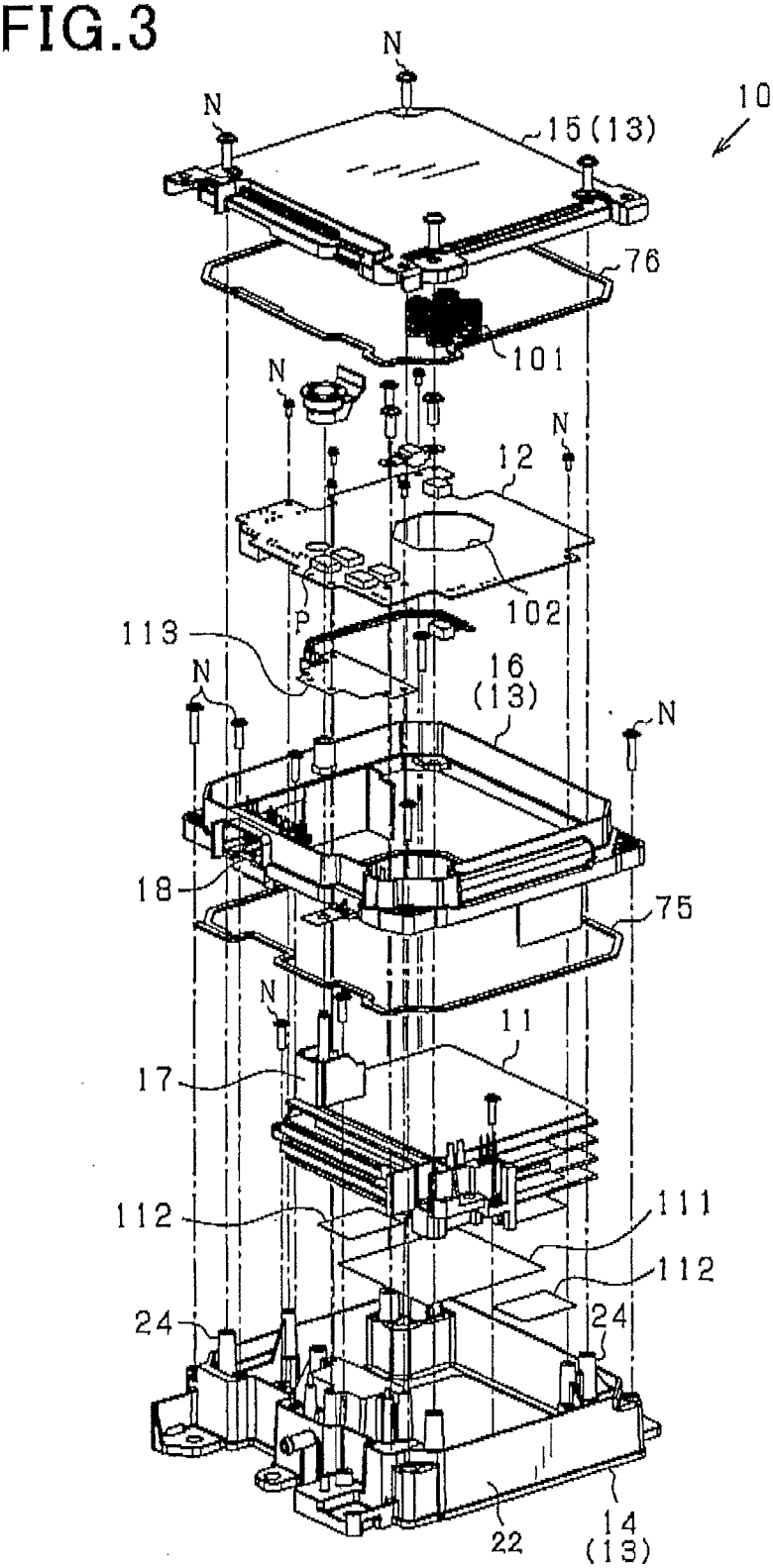
FIG. 3 is an exploded perspective view which shows essential parts of the battery unit of FIG. 1.

Referring to the drawings, wherein like reference numbers refer to like parts in several views, particularly to FIGS. 1 to 3, there is shown a battery unit 10 which is used, as an example, with a power supply system installed in an automotive vehicle equipped with an internal combustion engine, an electronic control unit (ECU) working to control operations of the engine or other electric devices, an electric generator (also called an alternator) which is driven by the engine to generate electricity, and an electric storage device which is charged by electric power produced by the generator. The electric storage device includes a lead acid battery and lithium-ion battery. The battery unit 10, as will be described below, is designed as the lithium-ion battery.

The overall structure of the battery unit 10 will be described below with reference to FIGS. 1 to 3. A vertical direction of the battery unit 10, as referred to in the following discussion, is based on orientation of the battery unit 10 placed, as illustrated in FIG. 1, on a horizontal plane for the sake of convenience.

The battery unit 10 consists essentially of an assembled battery module 11, a control board 12, and a storage case 13. The assembled battery module 11 is made up of a stack of laminated-type cells each covered with a laminate film. The control board 12 works as a controller to control charging or discharging of the assembled battery module 11. The storage case 13 has the assembled battery module 11 and the control board 12 installed therein and is made up of a base 14, a cover 15, and an intermediate case 16 (also called an intermediate casing member below). The base 14 will also be referred to as a first casing member below. A combination of the cover 15 and the intermediate case 16 will also be referred to as a second casing member below. The base 14 is fixed at a place where the battery unit 10 is installed. The cover 15 is arranged above the base 14. The intermediate case 16 is joined between the base 14 and the cover 15 as a side shell defining a portion of a side wall of the storage case 13. The assembled battery module 11 and the control board 12 are laid to overlap each other vertically. Specifically, the control board 12 is disposed above the assembled battery module 11. The assembled battery module 11 and the control board 12 are fixed to the base 14. The cover 15 and the intermediate case 16 are also fastened to the base 14.

The battery unit 10 is equipped with a terminal block 17 for electric connection with an external lead-acid battery or an electric generator and an electric connector 18 for electric connection with the ECU mounted in the vehicle. The electric connector 18 is also joinable to other electric loads to which the power is to be supplied from the battery unit 10. The terminal block 17 and the connector 18 are, as can be seen in FIG. 1, partially exposed outside the battery unit 10.

The structure of the battery unit 10 will be described below in detail.

Base 14 of Storage Case 13

Figure 4:
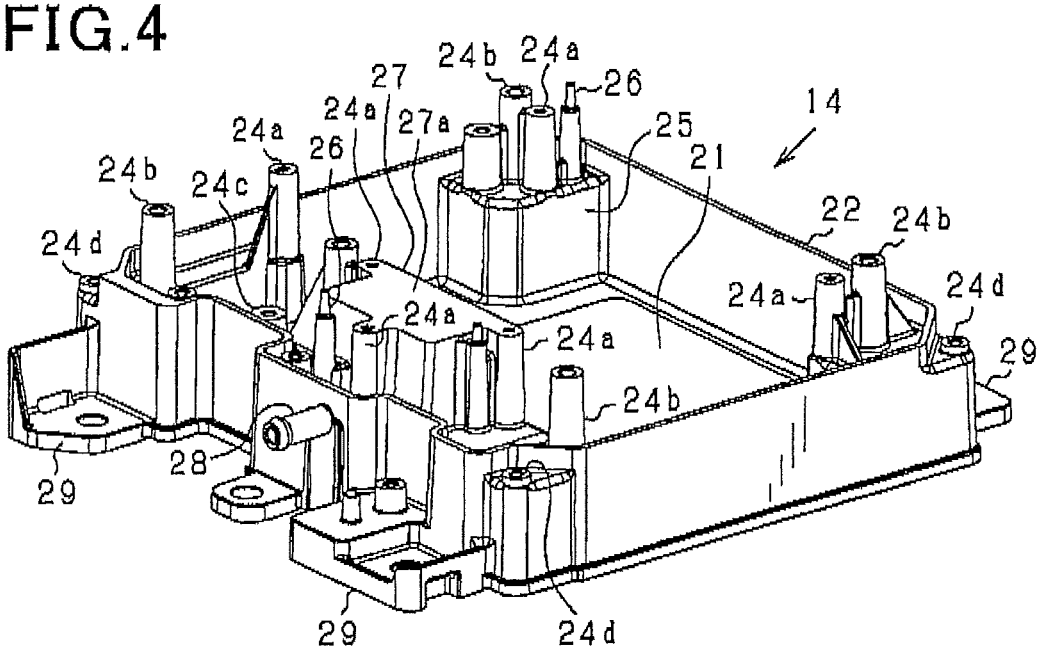
FIG. 4 is a perspective view which illustrates a base on which an assembled battery module is mounted.
Figure 5:
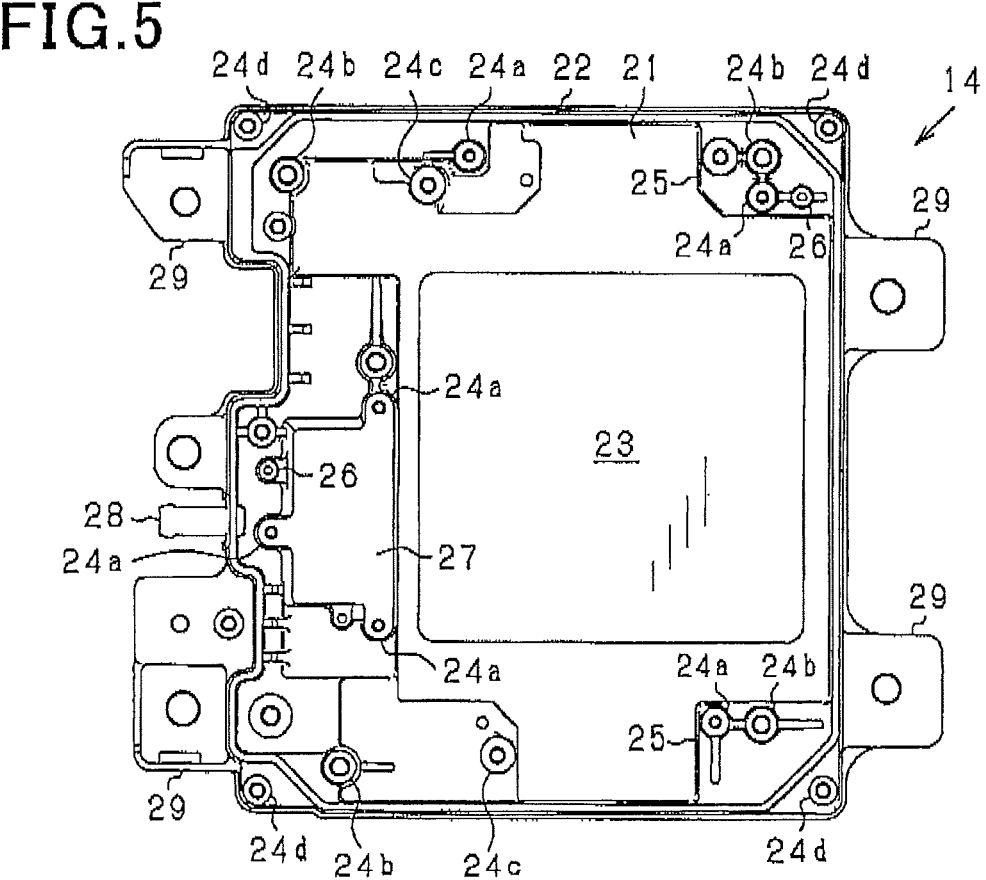
FIG. 5 is a plane view of FIG. 4.

The base 14 of the battery unit 10 will be explained. FIG. 4 is a perspective view of the base 14. FIG. 5 is a plane view of the base 14.

The base 14 is made from a metallic material such as aluminum and includes a bottom plate 21 and an upright wall 22 extending vertically from the bottom plate 21. The bottom plate 21 is substantially square in shape and has a circumferential edge from which the upright wall 22 extends. In other words, the upright wall 22 surrounds the circumference edge of the bottom plate 21. The bottom plate 21 serves as a module mount on which the assembled battery module 11 is retained. The upright wall 22 is so shaped as to completely encompass the assembled battery module 11 mounted on the bottom plate 21.

The base 14, as illustrated in FIG. 5, has a module mount surface 23 which is defined by a portion of a bottom wall of the base 14 and with which the assembled battery module 11 is mounted in direct contact. The module mount surface 23 protrudes slightly from its surrounding area of the base 14 and has an upper even surface formed by, for example, grinding or polishing. The upright wall 22 is of an annular shape and surrounds the assembled battery module 11.

To the base 14, the assembled battery module 11, the control board 12, the cover 15, and the intermediate case 16 are fastened. Specifically, the base 14 has a plurality of cylindrical fixing portions 24a to 24d which are used as fastener supports for securing the assembled battery module 11, the control board 12, the cover 15, and the intermediate case 16 to the base 14. The cylindrical fixing portions 24a to 24d will be also generally denoted by a reference number 24 below. The cylindrical fixing portions 24a are the fastener supports for the control board 12. The cylindrical fixing portions 24b are the fastener supports for the cover 15. The cylindrical fixing portions 24a and 24b extend vertically from the bottom of the base 14 inside the upright wall 22 and have top ends on which the control board 12 and the cover 15 are mounted. The base 14 also has formed on inner corners of the upright wall 22 base blocks 25 on which some of the cylindrical fixing portions 24a and 24b extend upwardly.

The cylindrical fixing portions 24c are the fastener supports for the assembled battery module 11 and located inside the upright wall 22. The cylindrical fixing portions 24c are lower in height than the upper end of the upright wall 22. The cylindrical fixing portions 24d are the fastener supports for the intermediate case 16 and located outside the upright wall 22.

The top end of each of the cylindrical fixing portions 24a to 24d has an even surface extending in the same direction as that in which the bottom surface of the bottom plate 21 extends. The top end of each of the cylindrical fixing portions 24a to 24b has a threaded hole formed therein. The installation of the assembled battery module 11, the control board 12, the cover 15, and the intermediate case 16 on the base 14 is achieved by placing them on the top ends of the cylindrical fixing portions 24a to 24d and then fastening screws N into the threaded holes of the cylindrical fixing portions 24a to 24d. The cylindrical fixing portions 24a to 24 may be formed in another shape and located either inside or outside the upright wall 22.

The base 14 also has a plurality of cylindrical locating pins 26 (two in this embodiment) extending upwardly, like the cylindrical fixing portions 24a and 24b. Each of the locating pins 26 has an outer shoulder and is made up of a small-diameter portion and a large-diameter portion. The small-diameter portion works as a positioner to position the control board 12 relative to the base 14.

The base 14 is equipped with a heat dissipator which serves to release heat, as generated by the assembled battery module 11 and the control board 12, to the environment. Specifically, the base 14 has, as illustrated in FIGS. 4 and 5, a heat sink 27 formed as the heat dissipator on the base plate 21 inside the upright wall 22. The heat sink 27 includes a board-facing plate 27a facing the back surface of the control board 12 and a plurality of fins (not shown) disposed below the board-facing plate 27a. The heat sink 27 is opposed to an area of the control board 12 in which power devices P are mounted. The heat, as produced by the power devices P, is transmitted to the board-facing plate 27a and then released from the fins outside the battery unit 10.

The power devices P are implemented by power semiconductor devices. Specifically, power transistors such as power MOSFETs or IGBTs are mounted as the power devices P on a power path leading to the assembled battery module 11 in the battery unit 10. The power devices P are turned on or off to control input or output of electric power into or from the assembled battery module 11. The battery unit 10 is, as described above, connected to the lead-acid battery and the electric generator. The power path leading to the assembled battery module 11 is, thus, connected to the lead-acid battery and the electric generator.

The base 14 has formed on the lower surface of the base plate 21 ribs (not shown) as a heat dissipator. The heat, as produced by the assembled battery module 11, is transmitted to the module mount surface 23 of the bottom plate 21 and then released from the ribs outside the battery unit 10. Similarly, the heat, as produced by the control board 12, is transmitted from the heat sink 27 to the bottom plate 21 and then released from the ribs on the bottom plate 21 outside the battery unit 10. The ribs also work as reinforcements.

The upright wall 22 also has formed therein a gas drain port 28 from which gas in the storage case 13 is drained outside the battery unit 10. The bottom plate 21 also has flanges 29 extending outwardly from the upright wall 22. Each of the flanges 29 has a hole through which a bolt passes for installation of the battery unit 10.

Cover 15

Figure 6:
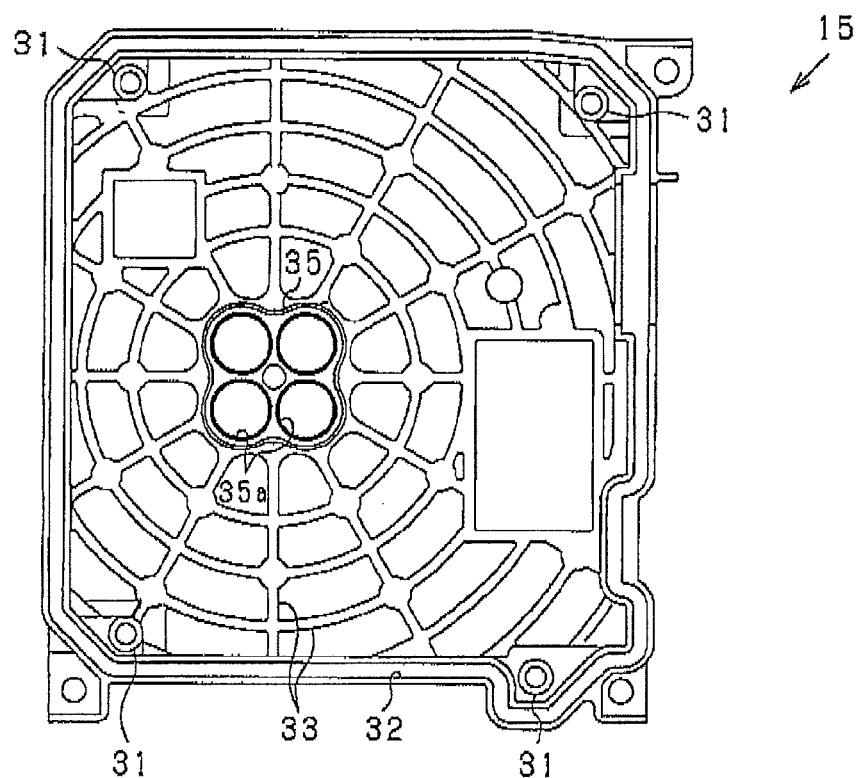
FIG. 6 is a bottom view which illustrates a cover fastened to the base of FIG. 5.

FIG. 6 is a bottom view of the cover 15 which defines the top of the storage case 13. The cover 15 is, like the base 14, made from a metallic material such as aluminum. The cover 15 is substantially square in shape and identical in size in a planar view thereof with the base 14 from which the flanges 29 are omitted. The cover 15 has formed on peripheral edges or corners thereof fixing portions 31 which are used as fastener supports to mechanically connect the cover 15 to the base 14. The cover 15 also has formed therein an annular groove 32 in which an upper end of the intermediate case 16 (i.e., an upper end of an intermediate wall 41, as will be described later) is fit. The fixing portions 31 are located at the four corners of the cover 15 in alignment with the cylindrical fixing portions 24b of the base 14. Each of the fixing portions 31 has a threaded hole formed therein. The annular groove 32 extends outside the fixing portions 31 and has a contour conformed to the contour of the upper end of the upright wall 22 of the base 14. The cover 15 has reinforcement ribs 33 formed on the lower surface thereof.

The cover 15 has formed on the lower surface thereof a spring holder 35 designed as a pressing mechanism holder. The spring holder 35 are also used as a spring press to hold coil springs 101, as disposed between the assembled battery module 11 and the cover 15, under pressure. The spring holder 35, as illustrated in FIG. 2, protrude downward from the lower surface of the cover 15 and has formed therein a plurality of cylindrical chambers 35a in which the coil springs 101 are disposed. A pressing mechanism using the coil springs 101 will be described later in detail.

The ribs 33 are disposed in a pattern radiating from the spring holder 35 to minimize the deformation or warp of the cover 15 arising from application of a mechanical load (i.e., reactive force of the springs 101 oriented to lift the cover 15 upward) to the spring holder 35. Specifically, the spring holder 35 works as a spring support to retain one of ends of each of the coil springs 101. The ribs 33 work as a deformation avoider to minimize the deformation of the cover 15.

The attachment of the cover 15 to the base 14 is achieved by placing each of the fixing portions 31 of the cover 15 on one of the cylindrical fixing portions 24b of the base 14 and fastening the screws N into the fixing portions 31 and the cylindrical fixing portions 24b. The cover 15 is, as can be seen from FIG. 2, located above the upright wall 22 of the base 14, so that a generally square closed window which is unoccupied by both the cover 15 and the base 14 is formed in a peripheral wall of the storage case 13.

Intermediate Case 16

Figure 7:
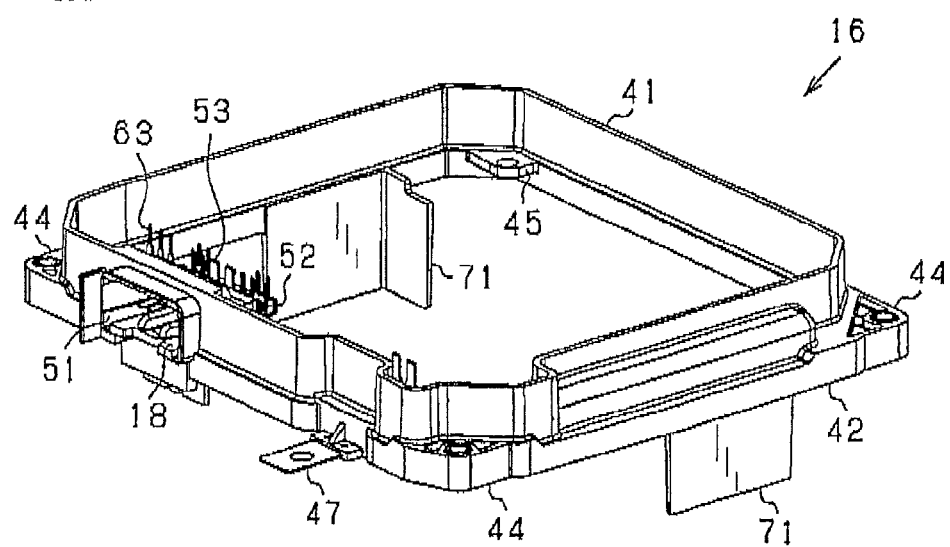
FIG. 7 is a perspective view which illustrates an intermediate case disposed between the base of FIG. 4 and the cover of FIG. 6.
Figure 8A:
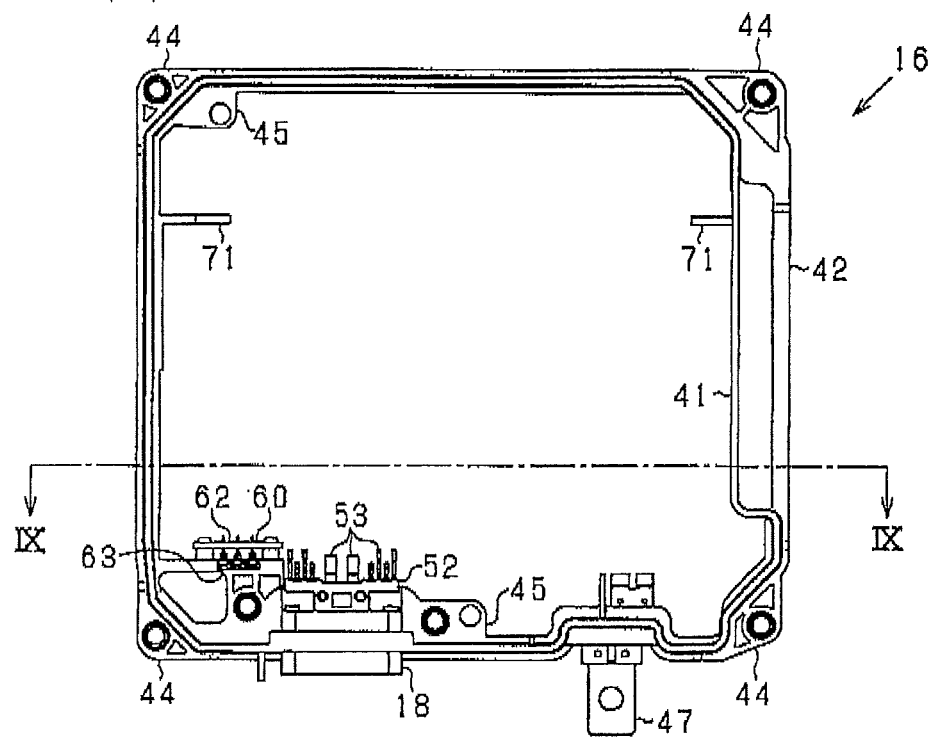
FIG. 8(*a*) is a plane view of the intermediate case of FIG. 7.
Figure 8B:
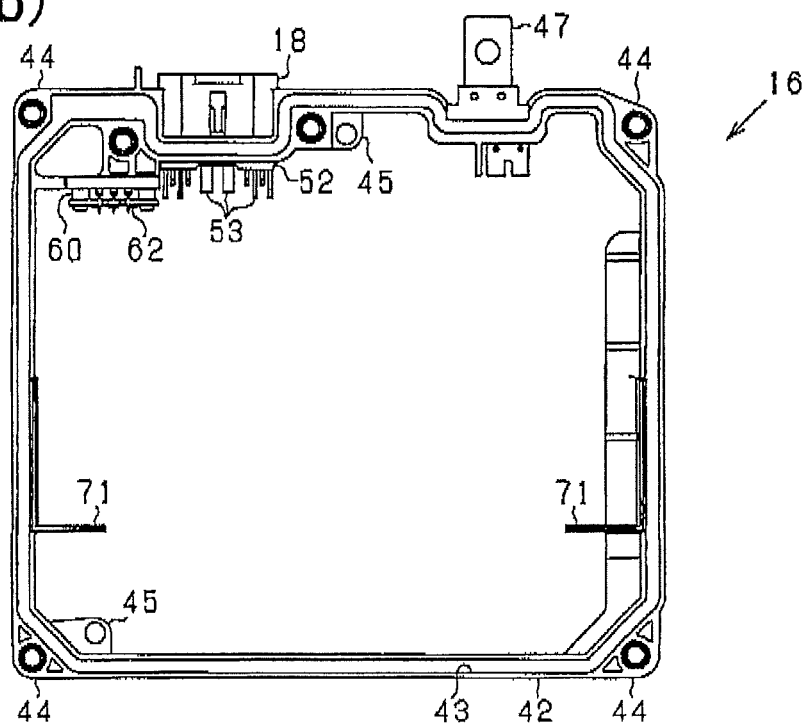
Figure 9:
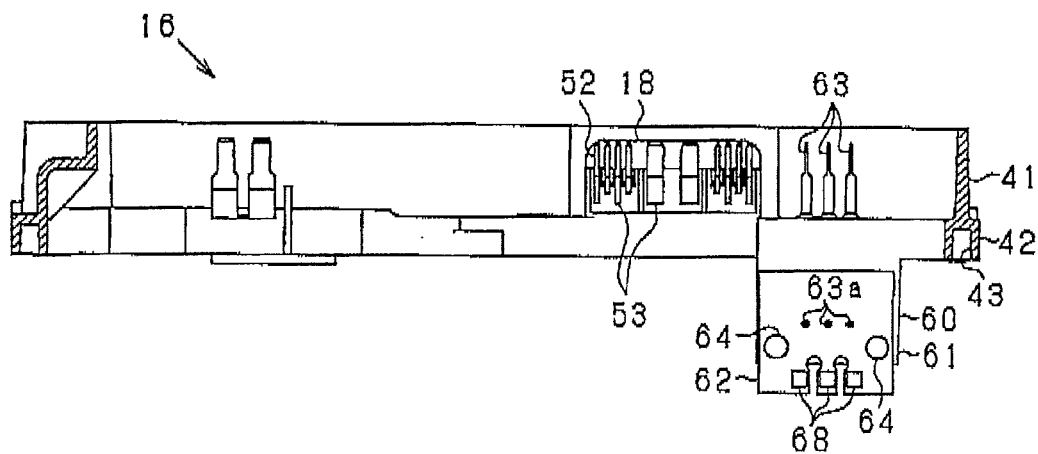
FIG. 9 is a vertical sectional view, as taken along the line IX-IX in FIG. 3(*a*)

The structure of the intermediate case 16 will be described below. FIG. 7 is a perspective view of the intermediate case 16. FIG. 8(a) is a plane view of the inter mediate case 16. FIG. 8(b) is a bottom view of the intermediate case 16. FIG. 9 is a sectional view, as taken along the line 9-9 in FIG. 8.

The intermediate case 16 is made of synthetic resin which is lower in stiffness than material of the base 14 and the cover 15. The intermediate case 16 is affixed to the base 14 and continuously extends from the upright wall 22 upward. The cover 15 is mounted on the intermediate case 16. The intermediate case 16 closes the above described square closed window, as unoccupied by both the cover 15 and the base 14.

The intermediate case 16, as illustrated in FIGS. 7, 8(a), and 8(b), has an intermediate wall 41 of a generally square closed shape. In other words, the intermediate wall 41 has a complete or unbroken side wall or circumference which defines a portion of the entire circumference of the storage case 13. The intermediate case 16 has a square closed frame 42 which defines a lower end thereof. The frame 42 has formed therein a square closed groove 43 in which the upper end of the upright wall 22 of the base 14 is fit. The frame 42 has fixing portions 44 formed outside the groove 43 fixing portions 44 which are affixed to the base 14. The fixing portions 44 are located in alignment with the fixing portions 24d of the base 14 and have threaded holes formed therein. The threaded holes extend through the thickness of the fixing portions 44, respectively. The attachment of the intermediate case 16 to the base 14 is achieved by placing the fixing portions 44 on the fixing portions 24d of the base 14 and then fastening screws N into the fixing portions 24d and 44. The intermediate case 16 is disposed on the top end of the upright wall 22 of the base 14.

The intermediate wall 41 has inner tabs in which holes 45 are formed through which the locating pins 26 (i.e., the large-diameter portion) of the base 14 pass, respectively.

The intermediate case 16 has disposed integrally thereon a connecting terminal 47 which is electrically joined to a terminal block 17. The intermediate case 16 also has a connector 18 affixed thereto. The connecting terminal 47 and the connector 18 are arranged adjacent each other in or on the same one of four side walls of the intermediate case 16.

The connector 18 is partially exposed outside the intermediate case 16 and made up of a connector shell 51 into which a, connector of a cable harness (not shown) is fit and a male plug 52 with a plurality of terminal pins 53 arrayed inside the connector shell 51. The terminal pins 52 partially extend upward and are electrically soldered to the control board 12. The terminal pins 53 include electric power output terminals (e.g., bus bars) and signal input/output terminals.

Figure 10:
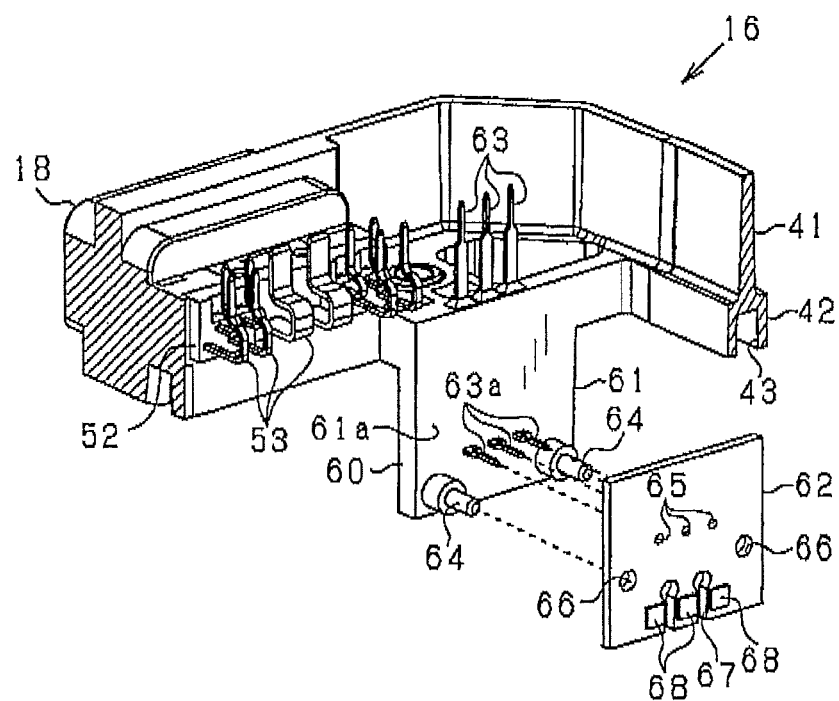
FIG. 10 is an enlarged perspective view of a water damage sensor.

The intermediate case 16 is equipped with a water damage sensor 60 disposed inside the intermediate wall 41. The water damage sensor 60 is located closer to the male plug 52 and works as a submergence detection sensor to detect the ingress of water into the battery unit 10, that is, whether the battery unit 10 has been submerged in water or not. FIG. 10 is an enlarged perspective view of the water damage sensor 60.

The water damage sensor 60 essentially consists of an extension plate 61 and a sensor substrate 62. The extension plate 61 extends downward from the frame 42. The sensor substrate 62 is affixed to the extension plate 61. The extension plate 61 is square and has a plurality of connecting terminals (i.e., electric conductors) 63 which are partially embedded therein. The connecting terminals 63 are each made of a bus bar. Each of the connecting terminals 63 has an end which extends upward from an upper end of the extension plate 61 and the other end which extends horizontally from a side surface 61a (i.e., a major surface) of the extension plate 61 to which the sensor substrate 62 is attached. Specifically, each of the connecting terminals 62 is bent at right angles within the extension plate 61. The side surface 61a (which will also be referred to as a substrate-mounting surface below) of the extension plate 61 has two cylindrical protrusions 64 formed on. Each of the cylindrical protrusions 64 is made up of two sections: a small-diameter portion and a large-diameter section. The cylindrical protrusions 64 are located at corners of the substrate-mounting surface 61a of the extension plate 61.

The sensor substrate 62 has formed therein an array of holes 65 in which pins 63a that are the lower ends of the connecting terminals 63 are fit and a pair of holes 66 into which the cylindrical protrusions 64 of the extension plate 61 are inserted. The attachment of the sensor substrate 62 to the substrate-mounting surface 61a of the extension plate 61 is achieved by inserting the pins 63a of the connecting terminals 63 and the cylindrical protrusions 64 of the extension plate 61 into the holes 65 and 66 and thermally staking heads of the cylindrical protrusions 64. After affixed to the extension plate 61, the sensor substrate 62 is oriented to have major surfaces extending vertically. The sensor substrate 62 has two slits 67 formed in a lower end thereof. The slits 67 extend vertically in parallel to each other. The sensor substrate 62 also has three water detecting electrodes 68 affixed adjacent the slits 67.

Figure 11:
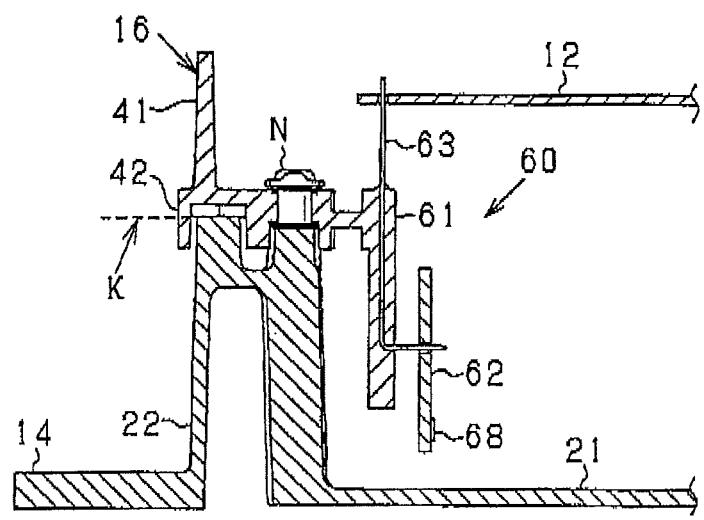
FIG. 11 is a vertical section view of a base and an intermediate case of a storage case which illustrates a vertical location of the water damage sensor of FIG. 10.

FIG. 11 illustrates the location of the water damage sensor 60 when the intermediate case 16 is attached to the base 14. FIG. 11 is a vertical section view of the water damage sensor 60 when the intermediate case 16 and the base 14 are assembled together.

The extension plate 61 is disposed inside the upright wall 22 of the base 14 when the intermediate case 16 is joined to the base 14. The sensor substrate 62 is located inside the extension plate 61. The three water detecting electrodes 68 are arranged lower than the lower end of the extension plate 61 (i.e., the upper end of the upright wall 22 of the base 14) and near the bottom plate 21. When the water enters the storage chamber 13, it will reach the water detecting electrodes 68 relatively quickly. This causes the water detecting electrodes 68 to be electrically connected to each other to output a signal indicative thereof to the control board 12.

The sensor substrate 62 is, as illustrated in FIG. 11, located beneath the control board 12 and has the major surface (i.e., an electronic part-mounting surface) traversing (i.e., extending substantially perpendicular to) the major surface (i.e., the electronic part-mounting surface) of the control board 12. The water detecting electrodes 68 are disposed at a level lower than an apparent boundary, as denoted by "K" in FIG. 11, between the base 14 and the intermediate case 16. The apparent boundary K lies between the top end of the upright wall 22 of the base 14 and the lower surface of a sealing member 75 fit in the groove 43 of the intermediate case 16. The control board 12 is located higher than the apparent boundary K. The direction in which the sensor substrate 62 extends is identical with that in which electrochemical cells 83 of the assembled battery module 11 are, as clearly illustrated in FIG. 2, laid to overlap each other.

The intermediate case 16, as illustrated in FIG. 7, includes insulating walls 71 extending downward from the frame 42. In the assembly of the intermediate case 16 and the base 14, the insulating walls 71, as clearly illustrated in FIG. 2, continue or extend from the intermediate case 16 toward the bottom plate 21 of the base 14 inside the upright wall 22. In other words, each of the insulating walls 71 is laid to overlap the upright wall 22 in the horizontal direction (i.e., a direction perpendicular to the thickness of the battery unit 10). The insulating walls 71 work to electrically isolate electrodes (i.e., electrode tabs 84 and 85 which will be described later in detail) of the assembled battery module 11 from the upright wall 22 and are located between the electrodes of the assembled battery module 11 and the upright wall 22. The base 14, as described above, has the base blocks 25 located inside the upright wall 22. Each of the insulating walls 71 is, as clearly illustrated in FIGS. 8(a) and 8(b), of an L-shape, in other words, has two wall sections extending perpendicular to each other to electrically isolate the electrodes of the assembled battery module 11 from the base blocks 25.

FIG. 2 illustrates the cover 15 and the intermediate case 16 which are fastened to the base 14. The upper end of the upright wall 22 of the base 14 is fit in the groove 43 of the frame 42 of the intermediate case 16. Specifically, the base 14 is fixed to the intermediate case 16 with the lower ends of the fixing portions 44 of the intermediate case 16 being in contact with the fixing portions 24d of the base 14. In this condition, the bottom of the groove 43 of the intermediate case 16 (i.e., one of opposed ends of the intermediate wall 41 which faces the base 14) is located at a given distance away from the upper end of the upright wall 22. The sealing member 75 (i.e., a mechanical seal) fills such an air gap between the groove 43 of the intermediate case 16 and the upper end of the upright wall 22. The sealing member 75 has a configuration, as illustrated in FIG. 3. The sealing member 75 is elastically compressed by the upper end of the upright wall 22 to create a liquid and air tight seal between the base 14 and the intermediate case 16.

The upper end of the intermediate wall 41 of the intermediate case 16 is fit in the groove 43 extending along the peripheral edge of the cover 15. Specifically, the cover 15 is fixed to the base 14 with the lower ends of the fixing portions 31 of the cover 15 being in contact with the fixing portions 24b of the base 14. In this condition, the bottom of the groove 32 of the cover 15 (i.e., one of opposed ends of the cover 15 which faces the base 14) is located at a given distance away from the upper end of the intermediate wall 41. A sealing member 76 (i.e., a mechanical seal) fills such an air gap between the groove 32 of the cover 15 and the upper end of the intermediate wall 41. The sealing member 76 has a configuration, as illustrated in FIG. 3. The sealing member 76 is elastically compressed by the upper end of the intermediate wall 41 to create a liquid and air tight seal between the cover 15 and the intermediate case 16. Instead of the sealing members 75 and 76, another type of seal such a liquid seal may be used. For instance, the liquid seal is applied to the grooves 43 and 32 and then hardened.

As apparent from the above discussion, the upper end of the upright wall 22 of the base 14 is placed in indirect contact with the bottom of the groove 43 of the intermediate case 16. Similarly, the upper end of the intermediate wall 41 of the intermediate case 16 is placed in indirect contact with the bottom of the groove 32 of the cover 15. In other words, buffers are disposed between the base 14 and the intermediate case 16 and between the intermediate case 16 and the cover 15 to avoid direction transmission of external force acting on the cover 15 from above to the intermediate case 16 and to the base 14.

Assembled Battery Module 11

Figure 12:
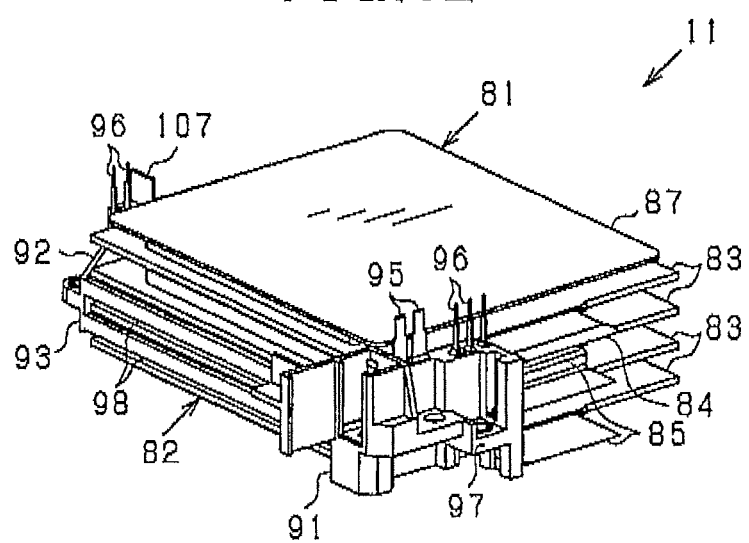
FIG. 12 is a perspective view which shows an assembled battery module mounted in the battery unit of FIG. 1.
Figure 13:
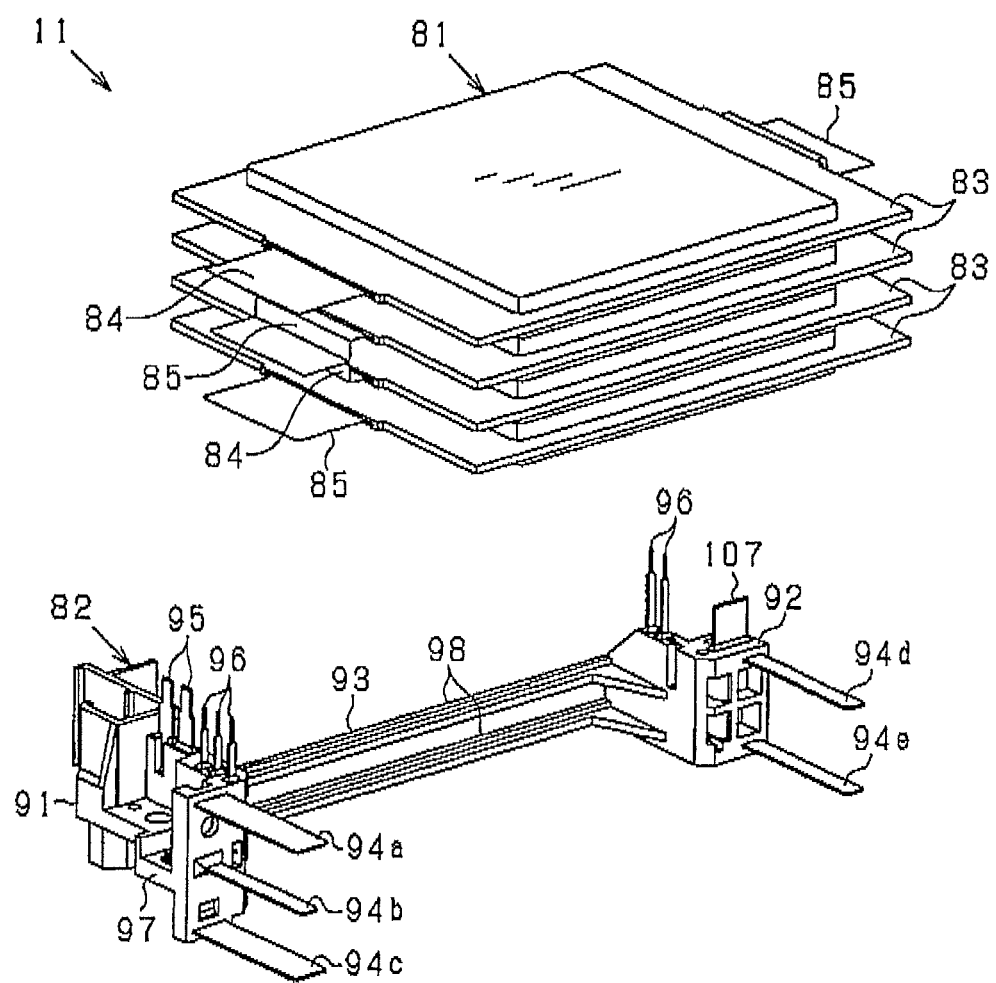
FIG. 13 is an exploded perspective view which illustrates an assembled battery module.
Figure 14:
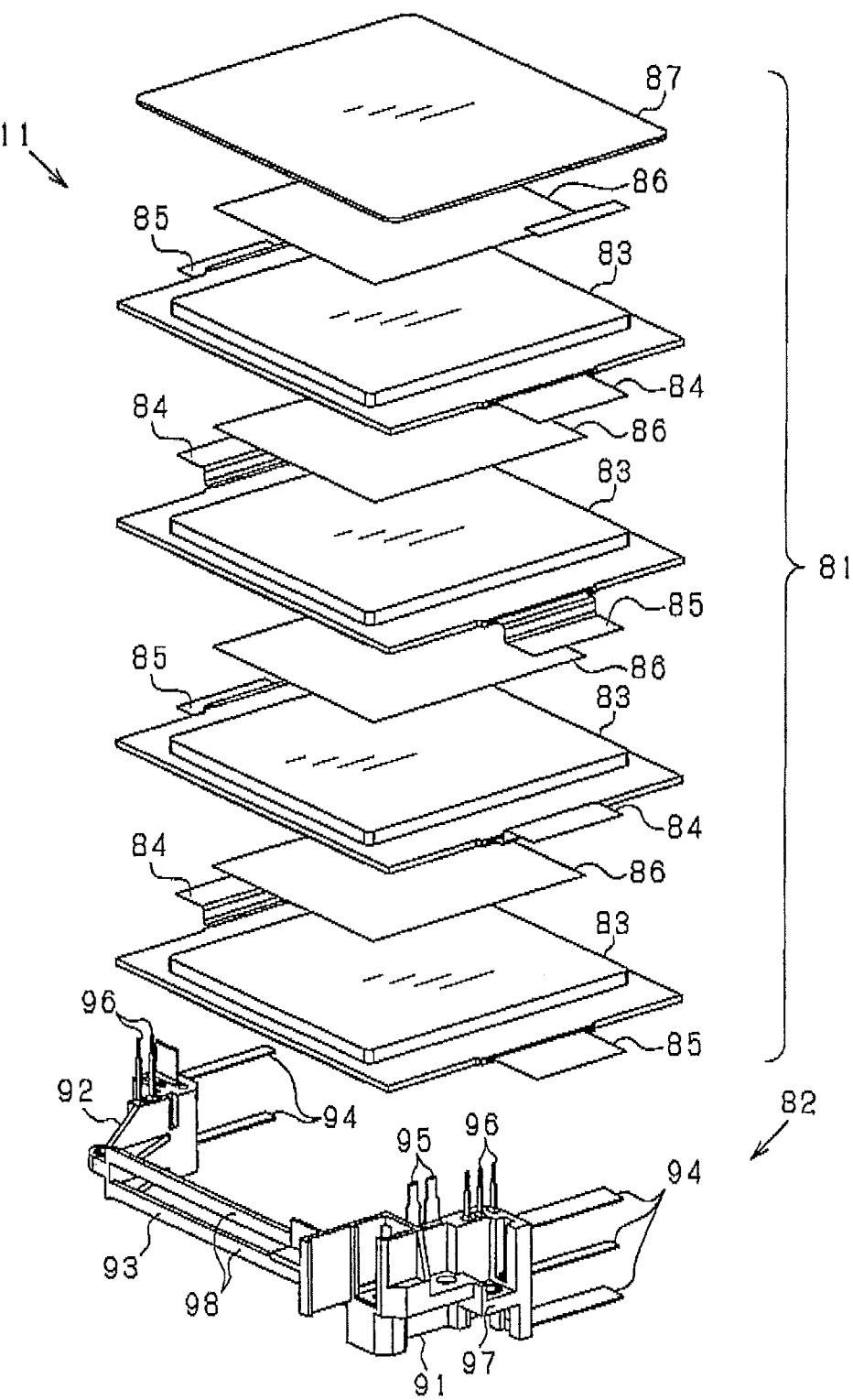
FIG. 14 is an exploded perspective view which illustrates an assembled battery module.

The structure of the assembled battery module 11 will be described below. FIG. 12 is a perspective view which illustrates the overall structure of the assembled battery module 11. FIGS. 13 and 14 are exploded perspective views of the assembled battery module 11.

The assembled battery module 11 works as a so-called battery and consists essentially of a battery assembly 81 of a plurality of (four in this embodiment) cells 83 and a battery holder 82 fastened to the battery assembly 81. The battery assembly 81 includes the cells 83 each of which is implemented by a laminated-type cell, as described in the introductory part of this application. Specifically, each of the cells 83 is made up of a flexible flattened casing formed by a pair of laminated films and a square cell body disposed in the casing. The cells 83 are laid to overlap each other in a thickness-wise direction thereof. Each of the cells 83 is of a planar shape and has a pair of electrode tabs 84 and 85 extending outward from the cell body. The electrode tabs 84 and 85 are affixed to diametrically opposed two of four sides of each of the cells 83. The electrode tab 84 serves as a positive electrode. The electrode tab 85 serves as a negative electrode. The positive electrode tab 84 is made of aluminum. The negative electrode tab 85 is made of copper.

The cells 83 are, as described above, stacked vertically, that is, in the height-wise direction of the battery unit 10 (i.e., the storage case 13). One of vertically adjacent two of the cells 83, as can be seen from FIGS. 12 and 13, has the positive electrode tab 84 disposed on the same side as the negative electrode tab 85 of the other cell 83. In other words, the positive electrode tab 84 of one of vertically adjacent two of the cells 83 is laid over the negative electrode tab 85 of the other cell 83 in the thickness-wise direction of the cells 83. The positive electrode tab 84 of each of the cells 83 is electrically joined to the negative electrode tab 85 of an adjacent one of the cells 83, so that all the cells 83 are electrically connected together in series.

Figure 15:
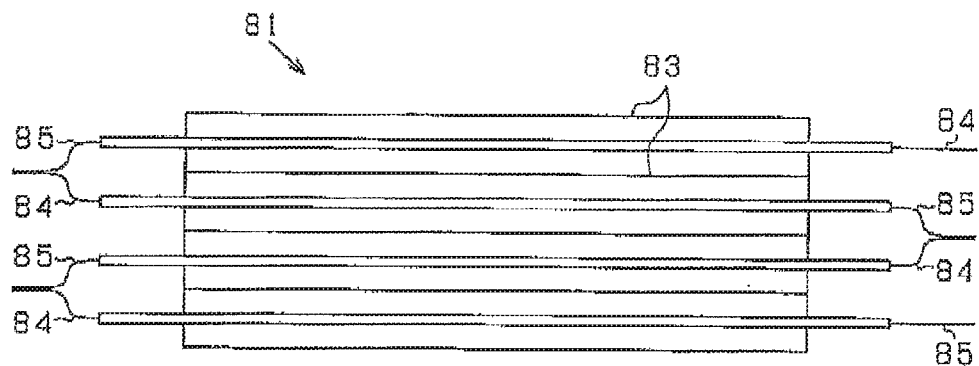
FIG. 15 is a side view which illustrates joints of electrode tabs of cells of an assembled battery module.

The positive electrode tab 84 and the negative electrode tab 85 of adjacent two of the cells 83 are so physically bent as to get close to each other to have portions laid to overlap each other vertically. Such overlapped portions are joined together, for example, by ultrasonic welding. In this embodiment, the positive electrode tab 84 and the negative electrode tab 85 of the battery assembly 81 are joined in the way, as illustrated in FIG. 15. Specifically, on the right side of the battery assembly 81, the uppermost positive electrode tab 84 and the lowermost negative electrode tab 85 extend straight in the horizontal direction, while the uppermost positive electrode tab 84 and the lowermost negative electrode tab 85 of intermediate two of the cells 83 are bent and welded together. On the left side of the battery assembly 81, the positive electrode tab 84 and the negative electrode tab 85 of upper two of the cells 83 are bent and welded together. Similarly, the positive electrode tab 84 and the negative electrode tab 85 of lower two of the cells 83 are bent and welded together.

An adhesive tape 86 is, as illustrated in FIG. 14, interposed between every two of the cells 83 to bond all the cells 83 together. The battery assembly 81 also has a rigid plate 87 affixed to the surface of the uppermost one of the cells 83 through the adhesive tape 86. The rigid plate 87 is made of, for example, iron sheet which has a surface area which is at least equal to that of each of the cells 83. In this embodiment, the surface area of the rigid plate 87 is greater in size than those of the cells 83. The rigid plate 87 serves as a spring support to mechanical loads, as produced by the coil springs 101.

The battery holder 82 is equipped with a first retainer 91, a second retainer 92, and a connector 93 which connects the first and second retainers 91 and 92 together. The first retainer 91 is attached to the electrode tabs 84 and 85 on one of the sides of the battery assembly 81, while the second retainer 92 is attached to the electrode tabs 84 and 85 on the opposed side of the battery assembly 81. The first retainer 91, the second retainer 92, and the connector 93 are formed integrally by synthetic resin.

Specifically, the first retainer 91 has three bus bars 94a, 94b, and 94c which will be generally denoted by reference numeral 94 below. The bus bars 94a, 94b, and 94c are cantilevered by the first retainer 91 and electrically connected to the positive and negative electrode tabs 84 and 85 extending from one of the opposed two of the sides of the battery assembly 81. The bus bars 94a, 94b, and 94c have major surfaces facing each other in the vertical direction (i.e., the thickness-wise direction of the battery assembly 81). Each of the bus bars 94a, 94b, and 94c has one of the major surfaces which is joined in contact with the surface of a corresponding one of the positive and negative electrode tabs 84 and 85, as illustrated on the right side of FIG. 15. The bus bar 94a works as a positive terminal of the battery assembly 81 (i.e., a positive terminal of a series circuit made up of the cells 83 connected in series). The bus bar 94c work as a negative terminal of the battery assembly 81 (i.e., a negative terminal of the series circuit). The bus bars 94a and 94c are connected to the power terminals 95 of the battery assembly 81, respectively.

The second retainer 92 has two bus bars 94d and 94e which will, be generally denoted by reference numeral 94 below. The bus bars 94d and 94e are cantilevered by the second retainer 92 and electrically connected to the positive and negative electrode tabs 84 and 85 extending from the other of the opposed two of the sides of the battery assembly 81. The bus bars 94d and 94e have major surfaces facing each other in the vertical direction (i.e., the thickness-wise direction of the battery assembly 81). Each of the bus bars 94d and 94e has one of the major surfaces which is joined in contact with the surface of a corresponding one of the positive and negative electrode tabs 84 and 85, as illustrated on the left side of FIG. 15.

The battery assembly 81 is designed to measure a terminal voltage appearing at each of the cells 83. Specifically, the first retainer 91 has three voltage detecting terminals 96 connected to the bus bars 94a, 94b, and 94c, respectively. The second retainer 92 has two voltage detecting terminals 96 connected to the bus bars 94d and 94e. The power terminals 95 and the voltage detecting terminals 96 all extend upward and have top ends joined to the control board 12.

Each of the voltage detecting terminals 96 may be made by a portion of one of the bus bars 94. In other words, each of the bus bars 94 may be used in detecting the terminal voltage at the cells 83. In this embodiment, each of the bus bars 94 is connected at one end to one of the positive and negative electrode tabs 84 and 85 of the battery assembly 81 and at the other end to the control board 12 as the voltage detecting terminals 96. Each of the bus bars 94 is bent and partially embedded in one of the first and second retainers 91 and 92.

The connector 93 is made up of an upper and a lower connecting bar 98. In other words, the connector 93 has a horizontal elongated opening or slit to have the upper and lower connecting bards 98. Each of the connecting bars 98 has a width which is, as can be seen from FIG. 12, small enough to be disposed in the space between the peripheral edges of the laminated films of vertically adjacent two of the cells 83. In the condition where the battery holder 82 is attached to the battery assembly 81, the connecting bars 98 each extend between the laminated films of the cells 83 without protruding from the periphery of the battery assembly 81. This is beneficial in reducing the overall size of the battery unit 10.

Each of the first and second retainers 91 and 92 has a height (i.e., a vertical dimension of the resinous body of each of the first and second retainers 91 and 92) which is, as can be seen in FIG. 2, smaller than an overall thickness of the battery assembly 81 (i.e., a vertical dimension of the battery assembly 81 in a direction in which the cells 83 are stacked). This enables the assembled battery module 11 to be mounted on the base 14 without physical interference of the retainers 91 and 92 with any parts of the battery unit 10.

Figure 16:
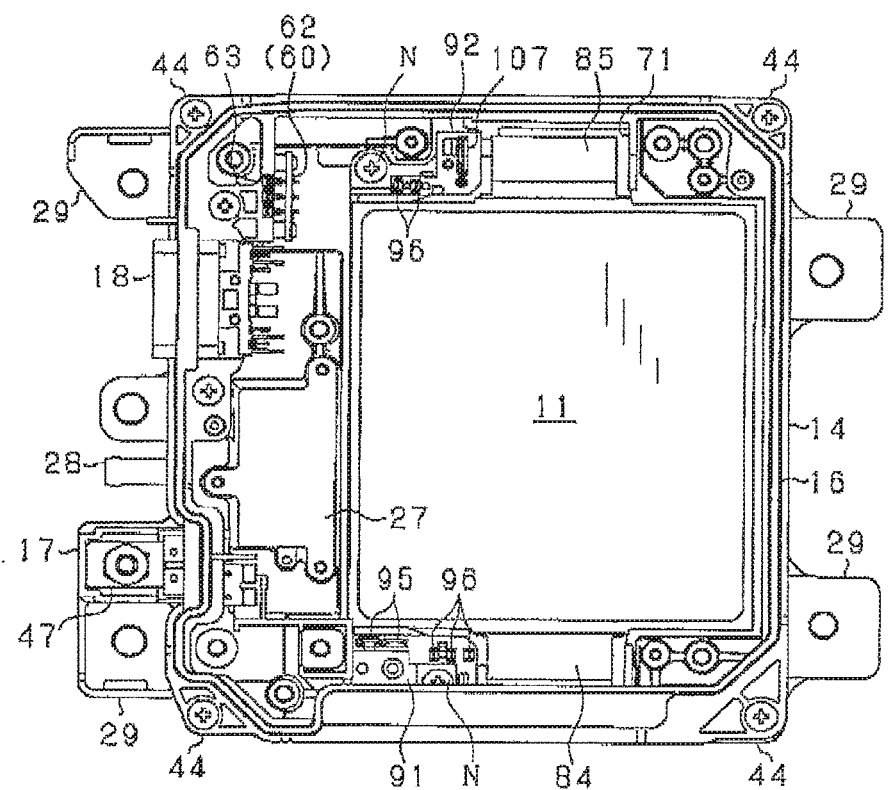
FIG. 16 is a plane view which illustrates an assembled battery module mounted on a base of a storage case of the battery unit of FIG. 1.

FIG. 16 is a plane view which illustrates the assembled battery module 11 mounted on the base 14 to which the intermediate case 16 is attached.

As viewed from the connector 18 of the intermediate case 16, the assembled battery module 11 is placed with the electrode tabs 84 and 85 located on the right and left sides of the body of the assembled battery module 11. The assembled battery module 11 is also arranged adjacent the heat sink 27 on the base 14. The battery holder 28 is fit in one of the sides of the assembled battery module 11 which is closer to the heat sink 27, that is, the connector 18 and the connecting terminal 47. The assembled battery module 11 is fixed on the base 14 with mounting walls 97 of the battery holder 82 (i.e., the first and second retainers 91 and 92) being fastened to the fixing portions 24c of the base 14 through screws N.

The double-sided tape (also called double stick tape) 111 is, as illustrated in FIG. 3, disposed below the body of the assembled battery module 11. The double-sided tape 111 bonds the bottom surface of the assembled battery module 11 to the base 14. The insulating sheets 112 are placed below the electrode tabs 84 and 85 of the battery assembly 81 to electrically isolate the electrode tabs 84 and 85 from the bottom plate 21.

Control Board 12

Figure 18:
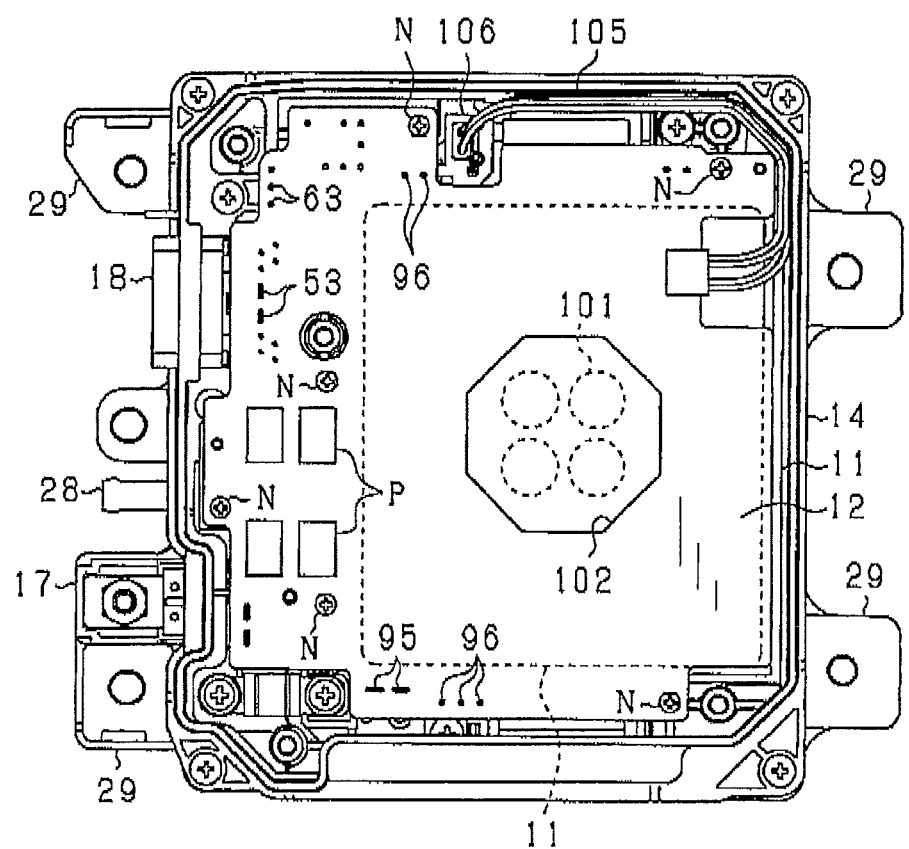
FIG. 18 is a plane view which illustrates the control board of FIG. 17 mounted on a base of a storage case.

The structure of the control board 12 will be described below. FIG. 18 is a plane view which illustrates the control board 12 mounted on the base 14. In FIG. 18, a broken line indicates the location of the assembled battery module 11 for the sake of simplicity.

The control board 12 is made of a printed circuit board which has a variety of electronic devices mounted on a major surface thereof. The surface of the control board 12 on which the electronic devices are fabricated will also be referred to as an electronic part-mounting surface below. Specifically, the control board 12 is equipped with a CPU (i.e., an arithmetic device) working as controller to perform a given control task to control charging and discharging operations of the assembled battery module 11 and the above described power devices P. The control board 12 is laid to overlap with the assembled battery module 11 vertically, that is arranged just above the assembled battery module 11 in the vertical direction thereof. In other words, the control board 12 is located farther away from the bottom plate 21 than the assembled battery module 11 is.

The control board 12 has the lower surface that is opposite the surface on which the power devices P, etc. are fabricated. The lower surface is placed on the fixing portions 24a of the base 14 and fastened to the base 14 through the screws N. Specifically, the control board 12 is, as can be seen from FIGS. 3 and 18, fastened at a plurality of locations to the base 14 through the screws N.

The water detecting electrodes 68 of the water damage sensor 60 are located near the bottom plate 21 of the base 14 so that the CPU (i.e., the controller) on the control board 12 may analyze an output from the water damage sensor 60 which indicates the immersion of the battery unit 10 in water to perform given tasks to, for example, stop charging or discharging the assembled battery module 11 before the battery unit 10 breaks down due to the immersion thereof in water.

The control board 12 has two areas: an overlap area which is laid to overlap with the assembled battery module 11 vertically, that is, arranged just above the assembled battery module 11 in the vertical direction thereof and a non-overlap area which is located out of coincidence with the assembled battery module 11 in the vertical direction. The power devices P are fabricated on the non-overlap area. The non-overlap area is located just above, in other words, faces the heat sink 27 of the base 14, as illustrated in FIG. 5, thereby facilitating the release of heat, as generated by the power devices P, outside the assembled battery module 11 through the heat sink 27.

The insulating sheet 113 is, as illustrated in FIGS. 3 and 4, interposed between the board-facing plate 27a of the heat sink 27 and the control board 12 to electrically isolate the heat sink 27 from the control board 12.

The joining of the control board 12 to the base 14 is achieved by inserting the terminal pins 53 and the connecting terminals 63 of the intermediate case 16 and the power terminals 95 and the voltage detecting terminals 96 of the assembled battery module 11 into holes formed in the control board 12 and then soldering them.

A temperature sensor 106 made of a thermistor is, as illustrated in FIG. 18, connected to the control board 12 through wires 105. The temperature sensor 106 is mounted on the assembled battery module 11 and works to measure the temperature of the assembled battery module 11. Specifically, the battery holder 82 of the assembled battery module 11 has, as illustrated in FIG. 12, a sensor mount 107 extending upward. The temperature sensor 105 is affixed to the sensor mount 107.

The battery unit 10 is, as described above, equipped with the pressing mechanism to press the assembled battery module 11 from above and hold it within the storage case 13. Specifically, the pressing mechanism is equipped with the coil springs 101, as illustrated in FIG. 2, arranged between the upper surface of the assembled battery module 11 and the cover 15 to press the assembled battery module 11 against the base 14. The installation of the coil springs 101 between the assembled battery module 11 and the cover 15 results in concern about physical interference between the control board 12 and the coil springs 101.

Figure 17:
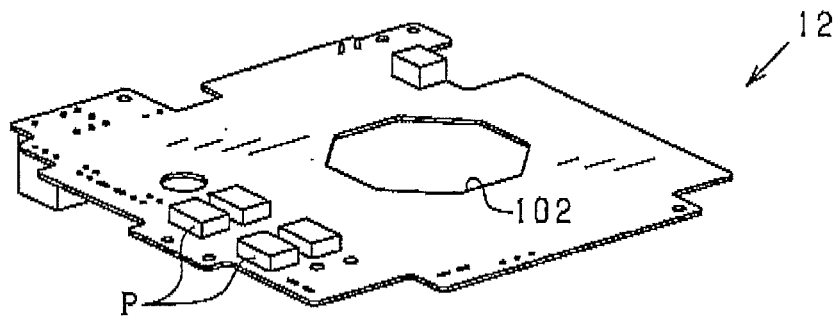
FIG. 17 is a perspective view which illustrates a control board installed in the battery unit of FIG. 1.

In order to alleviate the above problem, the control board 12 has a hole 102 passing through the thickness thereof to define a spring chamber in which the coil springs 101 are disposed. Each of the coil springs 101 has a length (i.e., an axis) which expands or contracts and is, as clearly illustrated in FIG. 2, disposed in the hole 102 with the length extending substantially perpendicular to the major surface of the control board 12. The hole 102 serves as an interference avoider to eliminate the physical interference between the control board 12 and the coil springs 101. The control board 12 is of a doughnut shape as a whole. The hole 101 is, as shown in FIGS. 17 and 18, of a polygonal shape, but may be circular.

Supplementing the explanation of the above pressing mechanism, the assembled battery module 11 has a central area of one of the opposed major surfaces thereof on which pressure, as produced by the coil springs 101, is exerted. In other words, the coil springs 101 are disposed on the central area of the upper surface of the assembled battery module 11. Such a central area will also be referred to as a pressure-exerted area below. The pressure-exerted area occupies the center of gravity of the assembled battery module 11 in a planar view thereof. The pressing mechanism has the four coil springs 11 arranged in a 2-by-2 matrix. The control board 12 is laid to overlap the center of gravity of the assembled battery module 11 in the vertical direction (i.e., the thickness-wise direction of the battery unit 10). Specifically, the hole 101 is formed in an area of the control circuit board 12 which covers or overlap the center of gravity of the assembled battery module 11 in the thickness-wise direction of the battery unit 10 (i.e., a direction in which the pressure, as produced by the coil springs 101, acts on the assembled battery module 11). In other words, the pressing mechanism (i.e., the coil springs 101) is so located as to exert mechanical pressure on the center of gravity of the assembled battery module 11 through the upper surface of the assembled battery module 11.

The rigid plate 87 is, as described above, affixed to the upper surface of the battery assembly 81 of the assembled battery module 11. The coil springs 101 are disposed on the rigid plate 87. The cover 15, as described already, has formed on the lower surface thereof the spring holder 35 which retains the ends of the coil springs 101. Specifically, the spring holder 35 has the chambers 35a in which the coil springs 101 are put, respectively, so that the coil springs 101 are located in place on the pressure-exerted area of the assembled battery module 11.

The cover 15 is joined to the base 14 and compresses the lengths of the coil springs 101 to produce mechanical pressure. The mechanical pressure is exerted on the assembled battery module 11. Use of the four coil springs 101 results in an increase in area of the assembled battery module 11 (i.e., the pressure-exerted area) on which the mechanical pressure, as produced by the coil springs 101 acts. Use of the rigid plate 87 achieves uniform distribution of the mechanical pressure over the upper surface of the battery assembly 81 of the assembled battery module 11.

Electrical Structure of Vehicle Power Supply System

Figure 19:
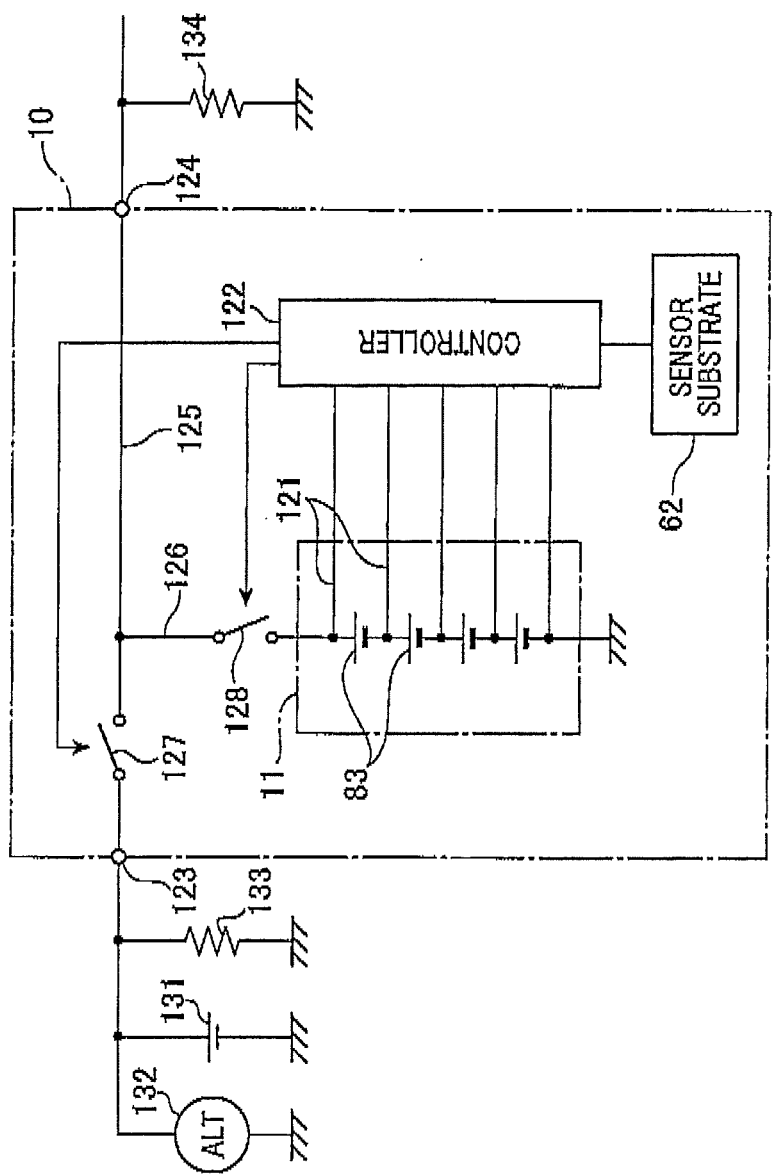
FIG. 19 is a circuit diagram which shows an electric structure of a power supply system.

The electrical structure of the in-vehicle power supply system will be described below with reference to FIG. 19. The assembled battery module 11 of the battery unit 10 is, as described above, equipped with the four cells 83 connected in series. Each of the cells 83 is connected at the positive and negative terminals thereof to a controller 122 through electric paths 121. The controller 122 is implemented by a CPU (i.e., an arithmetic device) working to perform a given control task to control the charging or discharging operation of the assembled battery module 11.

The controller 122 is an electronic part or device mounted on the control board 12. The bus bars 94 (94a to 94e), as illustrated in FIG. 13, are connected to the positive and negative terminals of the cells 83. The electric paths 121 are provided by the bus bars 94 and the voltage detecting terminals 96.

The battery unit 10 is equipped with connecting terminals 123 and 124 which are coupled together through a wire 125. The assembled battery module 11 is connected to a wire 126 diverging from the wire 125. A switch 127 is disposed in the wire 135. A switch 128 is disposed in the wire 126. Each of the switches 127 and 128 functions as a power control switching device made of, for example, a power MOSFET. The switches 127 and 128 correspond to the power devices P, as illustrated in FIG. 17. The sensor substrate 62 of the water damage sensor 60 is connected to the controller 122.

The power supply system includes a lead-acid storage battery 131 in addition to the battery unit 10. The lead-acid storage battery 131 is coupled to the connecting terminal 123 of the battery unit 10. The battery unit 10 and the lead-acid storage battery 131 are charged by an electric generator (also called an alternator) 132 installed in the vehicle. The vehicle is also equipped with a starter 133 as an electric load which is supplied from electric power from the lead-acid storage battery 131 to start an internal combustion engine mounted in the vehicle. To the battery unit 10, an electric load 134 such as an audio system or a navigation system mounted in the vehicle is coupled through the connecting terminal 134. The battery unit 10 supplies electric power to the electric load 134.

The on/off operation of the switch 127 controlled by the controller 122 will be described briefly. The switch 127 is opened or closed depending upon a state of charge (i.e., an available amount of electric energy) in the assembled battery module 11 and the lead-acid storage battery 131. Specifically, when the state of charge in the assembled battery module 11 is greater than or equal to a given value K1, the controller 122 turns off the switch 127 to disconnect the connecting terminal 123 and the assembled battery module 11. Alternatively, when the state of charge in the assembled battery module 11 has dropped below the given value K1, the controller 122 turn on the switch 127 to connect the connecting terminal 123 and the assembled battery module 11 to charge the assembled battery module 11 through the generator 132.

When it is required to start the engine using the starter 133, and the state of charge in the lead-acid storage battery 131 is greater than or equal to a given value K2, the controller 122 turns off the switch 127 to supply the electric power from the lead-acid storage battery 131 to the starter 133. Alternatively, when the state of charge in the lead-acid storage battery 131 is less than the given value K2, the controller 122 turns on the switch 127 to supply the electric power from the assembled battery module 11 to the starter 133.

The vehicle on which the power supply system is mounted is equipped with an automatic idle stop system (also called an automatic engine start/restart system) which works to automatically stop the engine when an ignition switch is in the on-state. When a given automatic engine stop condition is met, an ECU (i.e., an idle stop ECU) mounted in the vehicle stops the engine automatically. When a given automatic engine restart condition is met after the stop of the engine, the ECU restarts the engine using the starter 133. The automatic engine stop condition is, for example, a condition where an accelerator of the vehicle has been turned off or released, a brake of the vehicle has been turned on or applied, and the speed of the vehicle is less than a given value. The automatic engine restart condition is, for example, a condition where the accelerator has been turned on, and the brake has been turned off.

Installation of Battery Unit 10

The battery unit 10 is mounted on a floor of the vehicle which defines a passenger compartment. More specifically, the bottom plate 21 of the base 14 is disposed horizontally beneath front seats of the vehicle. The battery unit 10 is in the passenger compartment of the vehicle, so that there is a low possibility that the battery unit 10 is splashed with water or mud as compared with the case where the battery unit 10 is mounted inside an engine compartment of the vehicle. The battery unit 10 may alternatively be placed other than beneath the front seats, for example, in a space between rear seats and a rear luggage compartment.

The above described embodiment offers the following advantages.

The intermediate case 16, as described above, includes the extension plate 61 which extends downward inside the upright wall 22 of the base 14 toward the bottom plate 21 when the intermediate case 16 is joined to the base 14. The extension plate 61 has the lower end which is located closer to the bottom (i.e., the bottom plate 21) of the base 14 inside the upright wall 22 and the upper end opposed to the lower end. The extension plate 61 also has disposed thereon through the sensor substrate 62 the water detecting electrodes 68 which works as a water detector to detect the presence of water to provide a signal indicative thereof. The water detecting electrodes 68 are located close to the lowermost edge of the extension plate 61, that is, mounted on the lower end of the sensor substrate 62 which is as can be seen in FIG. 11, located close to the lowermost end of the extension plate 61. In the case illustrated in FIG. 11, the water detecting electrodes 68 are placed at the level slightly lower than the lower edge of the extension plate 61, but may be positioned at substantially the same level from the bottom plate 21. Such location of the water detecting electrodes 68 is very useful to detect the level of water which has entered and is accumulated in the storage case 13. The interval between the water damage sensor 60 and the bottom of the base 14 is regulated easily to determine whether the battery unit 10 has been submerged in a set level of water or not.

The connecting terminals 63 are installed on the upper end of the extension plate 61 and extend upward so that they are mechanically joined to the control board 12 and establish electrical connections with the control board 12 when the control board 12 is disposed in place within the storage case 13. This eliminates the need for electrical conductors such as wire to establish electrical connections between the water detecting electrodes 68 and the control board 12. Additionally, the installation of the control board 12 in the storage case 13 also achieves the electrical connections to the water detecting electrodes 68, thus facilitating the ease of installation of the water damage sensor 60 in the battery unit 10.

The extension plate 61 of the water damage sensor 60 has fixed thereon the sensor substrate 62 with major surfaces extending vertically. In other words, the substrate-mounting surface 61a of the extension plate 61 and the parts-mounting surface of the sensor substrate 62 extend in the vertical direction of the storage case 13 (i.e., the thickness-wise direction of the storage case 13). This layout results in a decreased volume of space required for installation of the water damage sensor 60 within the storage case 13 in planar view of the storage case 13, thus leading to a reduction in size of the battery unit 10.

The sensor substrate 62 of the water damage sensor 60 is located beneath the control board 12 and has opposed major surfaces (i.e., the part-mounting surface) intersecting or traversing opposed major surfaces (i.e., the part-mounting surface) of the control board 12. In this embodiment, the sensor substrate 62 extends perpendicular to the control board 12. This layout is suitable for utilizing a dead space around the assembled battery module 11 within the storage case 13. When water enters the storage case 13, the water detecting electrodes 68 will be first submerged in the water prior to the submergence of the control board, thus enabling a control task to be executed quickly and properly by the controller mounted on the control board 12 using an output from the water damage sensor 60 when the battery unit 10 is flooded.

The sensor substrate 62 (i.e., the substrate-mounting surface 61a) of the water damage sensor 60 extends in the same direction as that in which the cells 88 of the assembled battery module 11 are stacked, that is, laid to overlap each other. In other words, the sensor substrate 62 is disposed within space which has a height great enough to store the stack of the cells 83 in the storage case 13. The layout of the sensor substrate 62 is suitable for utilizing the dead space around the assembled battery module 11 within the storage case 13.

Each of the connecting terminals 63 of the water damage sensor 60 is made of a bus bar which has an end (will also be referred to as a first end below) which protrudes upward from the upper end of the extension plate 61 and the other end (will also be referred to as a second end below) which extends horizontally from, in other words, protrudes horizontally outside the substrate-mounting surface 61a of the extension plate 61 on which the sensor substrate 62 is mounted. The mechanical strength of the bus bars ensures the stability in the vertical and horizontal protrusion of the ends of the connecting terminals 63. This facilitates the ease of joining of the sensor substrate 62 and the control board 12 to the connecting terminals 63.

The storage case 13 is equipped with the cover 15 which forms the top of the storage case 13 and the intermediate case 16. The intermediate case 16 has the extension plate 61 formed integrally. This enables the assembling of the storage case 13 to be achieved simply by joining the intermediate case 16 to the base 14, then mounting the control board 12 on the base 12, and then attaching the cover 15 to the assembly of the intermediate case 16 and the base 14. The joining of the intermediate case 16 to the base 14 serves to install the water detecting electrodes 68 in place within the storage case 13. The mounting of the control board 12 on the base 14 serves to join the water damage sensor 60 electrically to the control board 12.

The water damage sensor 60 is, as apparent from the above discussion, mounted integrally on the intermediate case 16, thereby facilitating the ease with which the water damage sensor 60 is installed deep within the storage case. The connecting terminals 63 are, as described above, initially fixed to the intermediate case 16, thus greatly facilitating the electrical connection of the water damage sensor 60 to the control board 12.

The water detecting electrodes 68 (which works as a water detector) are, as described above, located at a level lower than the apparent boundary K, as illustrated in FIG. 11, between the base 14 and the intermediate case 16. The control board 12 is located at a level higher than the apparent boundary K. The minimizes the possibility that the control board 12 gets wet with water immediately when the water enters the storage case 13 of the battery unit 10.

The control board 12 is disposed above the assembled battery module 11 within the storage case 13, thus delaying the submergence of the control board 12 in water.

Modifications of the above embodiment will be described below.

The intermediate case 16 may be shaped to have a seat surface on which the control board 12 is disposed at the lower surface thereof. Specifically, the control board 12 may be mounted in direct contact with the sear surface of the intermediate case 16. This ensures the stability of installation of the control board 12 on the intermediate case 16 and also enhances the accuracy in placing the water damage sensor 60 at a desired level within the storage case 13. The intermediate case 16 may also be designed to grip or grasp the control board 12 firmly on the seat surface. For example, the thickness of the control board 12 may be clamped vertically on the intermediate case 16.

The water damage sensor 60 may be engineered to have the water detecting electrodes 68 disposed on the sensor substrate 62 at intervals away from each other in the vertical direction of the sensor substrate 62. This enables a rise in level of water within the storage case 13 to be monitored or detected.

The water detecting electrodes 68 may be arranged away from each other in a direction other than the vertical direction of the storage case 13. For example, the water detecting electrodes 68 may be placed at locations away from each other in the horizontal direction of the storage case 13. This enables the detection of local accumulation of water within the storage case 13.

The sensor substrate 62 is, as described above, affixed to the extension plate 61 of the intermediate case 16. The water detecting electrodes 68 are installed on the sensor substrate 62. This layout may be modified. For instance, the intermediate case 16 may have joined thereto a support plate or a support rod which retains the water detecting electrodes 68 (i.e., the water damage sensor 60) instead of the sensor substrate 62.

The storage case 13 is, as described above, made up of the base 14 (i.e., the first casing member), the cover 15 (i.e., the second casing member), and the intermediate case 16 (i.e., the second casing member), but may be formed by only the base 14 and the cover 15. For instance, the upright wall 22 of the base 14 is designed to have an increased height to provide a required space within the storage case 13 in the height direction thereof. Alternatively, the cover 15 may be designed to have a vertical side wall to provide a required overall height of the storage case 13.

The battery unit 10 is, as described above, mounted beneath the seats in the passenger compartment of the vehicle, however, may be disposed inside a dashboard or an engine compartment of the vehicle.

Each of the cells 83 is, as described above, implemented by a laminated-type cell, however, may be made of a can-type battery cell. Each of the cells 83, as used in the above embodiment, is a lithium-ion storage cell, but may be implemented by another type of secondary cell such as a nickel-cadmium storage cell or a nickel-hydrogen storage cell(s).

The battery unit 10 may be used with hybrid vehicles equipped with an internal combustion engine and an electric motor for driving road wheels or an electric vehicle equipped with only the electric motor as a drive source.

While the present invention has been disclosed in terms of the preferred embodiment in order to facilitate better understanding thereof, it should be appreciated that the invention can be embodied in various ways without departing from the principle of the invention.

What is claimed is:

1. A battery unit comprising:
    a battery;
    a control board on which an electronic device is mounted to control an operation of the battery;
    a storage case in which the battery and the control board are installed, the storage case including a first casing member and a second casing member joined to the first casing member, the first casing member having a bottom on which the battery is mounted and an upright wall which extends from the bottom and surrounds the battery, the second casing member having the battery interposed between itself and the first casing member, the second casing member also having an extension which extends vertically, the extension having an upper end joined to the second casing member and a lower end opposed to the upper end, the lower end extends toward the bottom of the first casing member, the lower end faces the bottom inside the upright wall of the first casing member;
    a substrate with a mounting surface, the substrate extending vertically;
    a water detector which is mounted on the mounting surface of the substrate, the mounting surface being secured to a lower end of the extension and extending in a vertical direction of the storage case, the water detector working to detect presence of water having entered the storage case; and
    an electric conductor which extends from the substrate, passing through the thickness of the extension vertically and further extending upward from the upper end of the extension, the electric conductor being electrically joined to the water detector, the electric conductor being also mechanically joined to the control board at a point vertically above the upper end of the extension, so as to establish an electrical connection with the control board which is mounted in place within the storage case.

2. A battery unit as set forth in claim 1, wherein the substrate is located beneath the control board and has the mounting surface traversing a mounting surface of the control board.

3. A battery unit as set forth in claim 1, wherein the battery is made up of a plurality of cells stacked in a height-wise direction of the battery unit, and wherein the mounting surface of the substrate extends in a direction in which the cells are stacked.

4. A battery unit as set forth in claim 1, wherein the electric conductor is made of a bus bar which has a first end and a second end opposed to the first end, the first end protruding from the upper end of the extension, the second end protruding from a mounting surface of the extension on which the substrate is mounted.

5. A battery unit as set forth in claim 1, wherein the second casing member includes a cover which forms a top of the storage case and an intermediate case which is interposed between the first casing member and the cover, the intermediate case having an unbroken intermediate wall, and wherein the intermediate case has the extension which extends from the intermediate wall toward the bottom of the first casing member.

6. A battery unit as set forth in claim 5, wherein the water detector is located at a level lower than a boundary between the first casing member and the intermediate case, and wherein the control board is located at a level higher than the boundary.

* * * * *